(12) United States Patent
Kokayeff et al.

(10) Patent No.: US 7,749,375 B2
(45) Date of Patent: Jul. 6, 2010

(54) HYDRODESULFURIZATION PROCESS

(75) Inventors: Peter Kokayeff, Naperville, IL (US); Laura Elise Leonard, Oak Park, IL (US)

(73) Assignee: UOP LLC, Des Plaines, IL (US)

( * ) Notice: Subject to any disclaimer, the term of this patent is extended or adjusted under 35 U.S.C. 154(b) by 209 days.

(21) Appl. No.: 11/852,174

(22) Filed: Sep. 7, 2007

(65) Prior Publication Data
US 2009/0065396 A1    Mar. 12, 2009

(51) Int. Cl.
*C10G 45/04* (2006.01)
*C10G 45/08* (2006.01)

(52) U.S. Cl. .............. 208/210; 208/213; 208/216 R; 208/217

(58) Field of Classification Search ............. 208/208 R, 208/209, 210, 212, 213, 216 R, 217
See application file for complete search history.

(56) References Cited

U.S. PATENT DOCUMENTS

| | | | | |
|---|---|---|---|---|
| 2,620,314 A | 12/1952 | Hoekstra | ...................... | 252/448 |
| 3,274,124 A | 9/1966 | O'Hara | ........................ | 252/451 |
| 3,909,450 A | 9/1975 | O'Hara | ........................ | 252/438 |
| 4,126,645 A | 11/1978 | Collins | ..................... | 260/677 A |
| 4,255,253 A | 3/1981 | Herrington et al. | ........ | 208/216 PP |
| 4,297,247 A | 10/1981 | Krabetz et al. | ................. | 252/468 |
| 4,440,871 A | 4/1984 | Lok et al. | ..................... | 502/214 |
| 4,567,029 A | 1/1986 | Wilson et al. | ................. | 423/306 |
| 4,686,314 A | 8/1987 | Wood et al. | .................. | 585/260 |
| 4,716,143 A | 12/1987 | Imai | ............................. | 502/326 |
| 4,764,498 A | 8/1988 | Wissner et al. | ............... | 502/251 |
| 4,771,029 A | 9/1988 | Pereira et al. | | |
| 4,793,984 A | 12/1988 | Lok et al. | .................... | 423/306 |
| 4,988,659 A | 1/1991 | Pecoraro | ..................... | 502/235 |
| 4,992,157 A | 2/1991 | Bricker et al. | ................. | 208/12 |
| 5,200,382 A | 4/1993 | Cody et al. | ................... | 502/204 |
| 5,276,231 A | 1/1994 | Kocal et al. | ................... | 585/323 |
| 5,516,740 A | 5/1996 | Cody et al. | ................... | 502/204 |
| 5,648,576 A | 7/1997 | Nguyen Than et al. | ...... | 585/260 |
| 5,677,261 A | 10/1997 | Tenten et al. | ................. | 502/439 |
| 5,889,187 A | 3/1999 | Nguyen Than et al. | ...... | 585/260 |
| 5,925,238 A | 7/1999 | Duddy et al. | ................ | 208/210 |
| 5,935,889 A | 8/1999 | Murrell et al. | ................. | 502/9 |
| 5,955,397 A | 9/1999 | Didillon et al. | ............. | 502/339 |
| 5,972,829 A | 10/1999 | Ichimura | ..................... | 502/303 |
| 6,054,409 A | 4/2000 | Nguyen Thanh et al. | .... | 502/330 |
| 6,126,814 A | 10/2000 | Lapinski et al. | ............. | 208/217 |

(Continued)

FOREIGN PATENT DOCUMENTS

EP    0 542 528 B1    1/1996

(Continued)

*Primary Examiner*—Walter D Griffin
*Assistant Examiner*—Renee Robinson
(74) *Attorney, Agent, or Firm*—James C Paschall

(57) ABSTRACT

In one aspect, a hydrodesulfurization process is provided that selectively desulfurizes a hydrocarbon stream with minimal olefin saturation and minimal recombination of sulfur into mercaptans. In another aspect, the process includes a multi-stage reaction zone including at least first and second serial hydrodesulfurization reaction zones that sequentially remove sulfur from a hydrocarbon stream. In yet another aspect, the process is particularly suited to selectively desulfurize an olefinic naphtha hydrocarbon stream, such as FCC naphtha, steam cracked naphtha, coker naphtha, or other gasoline boiling hydrocarbon streams.

19 Claims, 1 Drawing Sheet

U.S. PATENT DOCUMENTS

| | | | |
|---|---|---|---|
| 6,177,381 B1 | 1/2001 | Jensen et al. | 502/325 |
| 6,228,800 B1 | 5/2001 | Yamaguchi et al. | 502/339 |
| 6,239,322 B1 | 5/2001 | Didillon et al. | 585/260 |
| 6,270,654 B1 | 8/2001 | Colyar et al. | 208/57 |
| 6,288,273 B1 | 9/2001 | Heidemann et al. | 562/542 |
| 6,291,391 B1 | 9/2001 | MacArthur | 502/216 |
| 6,465,391 B1 | 10/2002 | Cheung et al. | 502/330 |
| 6,509,292 B1 | 1/2003 | Blankenship et al. | 502/330 |
| 6,592,842 B2 | 7/2003 | Elder et al. | 423/610 |
| 6,673,237 B2 | 1/2004 | Liu et al. | 208/213 |
| 6,686,309 B1 | 2/2004 | Didillon et al. | 502/313 |
| 6,692,635 B2 | 2/2004 | Didillon et al. | 208/211 |
| 6,710,003 B2 | 3/2004 | Jan et al. | 502/60 |
| 6,756,515 B2 | 6/2004 | Rende et al. | 585/444 |
| 6,896,795 B2 | 5/2005 | Didillon et al. | 208/57 |
| 6,913,688 B2 | 7/2005 | Coker et al. | 208/210 |
| 6,960,291 B2 | 11/2005 | Greaney et al. | 208/203 |
| 7,087,191 B2 | 8/2006 | Van Hardeveld et al. | 252/373 |
| 7,176,159 B1 | 2/2007 | Wheelock et al. | 502/303 |
| 7,220,352 B2 | 5/2007 | Halbert et al. | 208/216 R |
| 7,244,352 B2 | 7/2007 | Halbert et al. | 208/212 |
| 2003/0036476 A1 | 2/2003 | Arnold et al. | 502/325 |
| 2005/0284799 A1 | 12/2005 | Bauer et al. | |
| 2006/0000751 A1* | 1/2006 | Bouchy et al. | 208/217 |

FOREIGN PATENT DOCUMENTS

| | | |
|---|---|---|
| EP | 1 857 527 A1 | 11/2007 |
| JP | 54-157507 A | 12/1979 |
| WO | WO 01/38457 A1 | 5/2001 |
| WO | WO 03/046113 A1 | 6/2003 |
| WO | WO 03/099963 A1 | 12/2003 |

* cited by examiner

What# HYDRODESULFURIZATION PROCESS

FIELD

The field relates to a hydrodesulfurization process and, in particular, a selective hydrodesulfurization process for olefinic naphtha streams.

BACKGROUND

Due to environmental concerns and newly enacted rules and regulations, petroleum products are expected to meet lower and lower limits on contaminates, such as sulfur and nitrogen. New regulations require the removal of sulfur compositions from liquid hydrocarbons, such as those used in gasolines, diesel fuels, and other transportation fuels. For example, ultra low sulfur diesel (ULSD) requirements are typically less than about 10 ppm sulfur, and current regulations permit up to about 30 ppm sulfur in gasoline. A reduction in sulfur levels to less than about 10 ppm in gasoline fuels also may be desirable.

Hydrodesulfurization is a hydrotreating process often used for removal of sulfur from olefinic naphtha streams by converting sulfur in the feed to hydrogen sulfide via contact with suitable catalysts. In some cases, high temperatures and pressures may be required to obtain the desired low levels of sulfur. High temperature processing of olefinic naphtha, however, may result in a lower grade fuel due to saturation of olefins leading to an octane loss. Low octane gasoline may require additional refining, isomerization, blending, and the like to produce higher quality fuels suitable for use in gasoline products. Such extra processing adds additional cost, expense, and complexity to the process, and may result in other undesirable changes in the products.

Because olefin saturation is generally favored at higher reaction temperatures, one form of hydrodesulfurization employs relatively mild temperatures in a hydrotreating reaction zone to favor desulfurization reactions relative to reactions resulting in olefin saturation. At such conditions, however, hydrogen sulfide produced during the hydrotreatment stage frequently reacts at these relatively mild conditions to form mercaptans. These reactions are often called reversion or recombination reactions.

The presence of recombined sulfur in olefinic naphtha streams may render it more difficult to achieve desirable low sulfur levels. In some cases, the recombination of sulfur can be prevented by saturating the olefins, but as discussed above, olefin saturation in naphtha results in an undesired octane loss. In other cases, recombined sulfur can be removed using various methods such as aqueous treatment methods, base solutions, phase transfer catalysts to suggest but a few. Such additional processing, however, adds cost and expense to the refiner. Moreover, the recombined mercaptans can be branched or have high molecular weights rendering them more difficult to completely remove from hydrocarbon streams.

In some cases, mercaptan formation in naphtha desulfurization can be minimized using a two-stage hydroprocessing unit with or without interstage removal of hydrogen sulfide. For example, in a first stage, a hydroprocessing reaction zone removes a large portion of the sulfur from the hydrocarbon stream to form hydrogen sulfide. The effluent from the first stage reaction zone then may be cooled and the hydrogen sulfide removed prior to a second stage reactor. The liquid effluent without hydrogen sulfide is then reheated and fed to a second stage reaction zone where another hydroprocessing zone removes the remaining sulfur to desired levels. In other cases, the effluent from the first stage is sent directly to the second stage.

Separating the hydrogen sulfide from the effluent prior to the second reaction zone generally minimizes mercaptan formation in the second reaction zone because there is minimal hydrogen sulfide to recombine. In many cases, the second stage reactor is operated in the same temperature range as the first stage reactor to disfavor olefin saturation. Therefore, if the hydrogen sulfide is not removed prior to this second reaction zone, sulfur recombination would most likely occur at such lower second stage temperatures. Interstage removal of hydrogen sulfide, however, adds complexity and cost to the refining process.

Catalysts and coated catalysts to desulfurize hydrocarbon streams, such as crude oils, heavy oils, vacuum gas oils, naphtha, and other gasoline boiling hydrocarbon streams often include bismuth, molybdenum, vanadium, tungsten, cobalt, nickel, palladium, platinum, iron, and mixtures thereof to remove sulfur from the hydrogen streams. Common operating conditions range from about 200° C. (392° F.) up to about 600° C. (1,112° F.). However, as discussed above, when desulfurizing olefinic naphtha or other gasoline boiling hydrocarbons at high temperatures, such as in some cases above about 315° C. (600° F.), the catalysts also concurrently saturate olefins leading to a loss of octane. As discussed above, decreasing temperatures to minimize olefin saturation would then tend to favor mercaptan formation.

Although a wide variety of process flow schemes, operating conditions and catalysts have been used in commercial petroleum hydrocarbon conversion processes, there is always a demand for new methods and flow schemes. In many cases, even minor variations in process flows or operating conditions can have significant effects on both quality and product selection, as well as on economic considerations, such as capital expenditures and operational utility costs.

SUMMARY

A hydrodesulfurization process is provided that desulfurizes a hydrocarbon stream that can minimize olefin saturation and can minimize recombination of sulfur into mercaptans. In one aspect, the process includes a multi-stage reaction zone including at least first and second serial hydrodesulfurization reaction zones that sequentially remove sulfur from a hydrocarbon stream.

In this aspect, the process includes a first reaction zone that operates at conditions selected to desulfurize a hydrocarbon stream to form hydrogen sulfide and, at the same time, disfavor olefin saturation. The process further includes a second reaction zone that operates at conditions and with a catalyst selected to further desulfurize the effluent from the first reaction zone, disfavor olefin saturation, and disfavor mercaptan formation. In one aspect of the first reaction zone, the selected conditions in the first reaction zone include moderate to low temperatures, such as between 260° C. (500° F.) to about 315° C. (600° F.), in a first hydrodesulfurization zone and using at least a hydrodesulfurization catalyst effective to remove a majority of sulfur from the feed and, at the same time, minimize olefin saturation. In such aspect, the selected conditions in the first reaction zone converts greater than about 50 percent of the sulfur content to hydrogen sulfide and saturates less than about 30 percent of the olefin content.

Using such selected conditions and catalysts, the process in these aspects generally avoids the need to remove hydrogen sulfide between the first and second reaction zones because recombination of the hydrogen sulfide in the hydrocarbon stream is minimized and, preferably, inhibited due to the operating conditions and catalyst configuration therein. In one aspect of the second reaction zone, the selected conditions in the second reaction zone include higher temperatures, such as about 315° C. (600° F.) to about 398° C. (750° F.), in a second hydrodesulfurization zone to disfavor mercaptan formation and using an optimized catalyst configuration effective to desulfurize the hydrocarbon stream and, at the same time, provide for minimal olefin saturation. In such aspect, the second reaction zone is configured to form less than about 10 ppm mercaptans, saturate less than about 20 percent of the olefin content, and convert about 90 percent of the sulfur content to hydrogen sulfide.

After separation of the undesired sulfur, the olefinic naphtha stream preferably has less than about 10 ppm sulfur, but the sulfur content will generally vary depending on the product being produced. The process is particularly suited to desulfurize an olefinic naphtha hydrocarbon stream, such as FCC naphtha, steam cracked naphtha, coker naphtha, or other gasoline boiling hydrocarbon streams.

Achieving lower levels of sulfur in olefinic naphtha while minimizing octane loss and preventing recombination of sulfur to mercaptans can present a challenge for refiners. The challenge generally results from, among other factors, the relationship between olefin saturation, mercaptan formation, and reaction temperature under typical hydrodesulfurization conditions. On one hand, higher reaction temperatures under such conditions generally favor olefin saturation. On the other hand, it is believed that sulfur recombination typically is inversely related to reaction temperature such that mercaptan formation is generally favored by lower temperatures. It also is believed that under typical hydrodesulfurization conditions, reaction temperatures generally above about 315° C. (600° F.) tend to favor olefin saturation while mercaptan formation is generally favored by temperatures below about 315° C. (600° F.). Such temperature ranges are approximate and generally depend on feed composition, pressures, catalyst systems, and the like.

In yet another aspect, the second reaction zone includes an optimized layered catalyst configuration having an inner core and a thin outer layer. The thin outer layer includes a hydrodesulfurization catalyst in a predetermined thickness optimized to remove sulfur and disfavor olefin saturation. In one such aspect, the layered catalyst has an active layer of about 5 to about 100 microns, in another aspect, about 5 to about 50 microns and, in yet another aspect, about 5 to about 30 microns. It is believed (without limitation as to theory) that such reduced catalyst thickness provides sufficient contact between the active metal-catalyst and the hydrocarbon stream to remove additional sulfur, but does not provide sufficient contact time between the oil and catalyst to significantly saturate olefins in the stream.

As shown in more detail in the Example, such a layered desulfurization catalyst configuration with a thin outer layer of active materials combined with the selective desulfurization conditions provides an unexpected step change in selectivity (i.e., favoring desulfurization over olefin saturation) as compared to conventional sized hydrotreating catalysts and a granulated hydrotreating catalyst. The improvement in selectivity of the catalysts herein is unexpected because even at higher temperatures the layered catalyst with a thin active layer favors desulfurization over olefin saturation, where at such higher temperatures the use of conventional catalysts would typically favor the undesired olefin saturation.

In yet another aspect, the catalyst in the second hydrotreating zone has a selectivity Ratio of sulfur conversion over olefin conversion greater than about 500 where selectivity is defined by formula A:

$$\text{Selectivity Ratio} = (100)\frac{(S_f - S_p/S_f)}{(O_f - O_p/O_f)} = (100)\frac{Sulfur Conversion}{Olefin Conversion} \quad (A)$$

wherein
$S_f$=sulfur content in the feed to the second hydrodesulfurization zone,
$S_p$=sulfur content in the second hydrodesulfurization zone effluent,
$O_f$=olefin content in the feed to the second hydrodesulfurization zone, and
$O_p$=olefin content in the second hydrodesulfurization zone effluent.

Other embodiments encompass further details of the process, such as preferred feed stocks, preferred catalysts, and preferred operating conditions to provide but a few examples. Such other embodiments and details are hereinafter disclosed in the following discussion of various aspects of the process.

BRIEF DESCRIPTION OF THE DRAWING

The FIGURE is an exemplary process to selectively desulfurize an olefinic naphtha stream.

DETAILED DESCRIPTION OF THE PREFERRED EMBODIMENT

Figure 1:
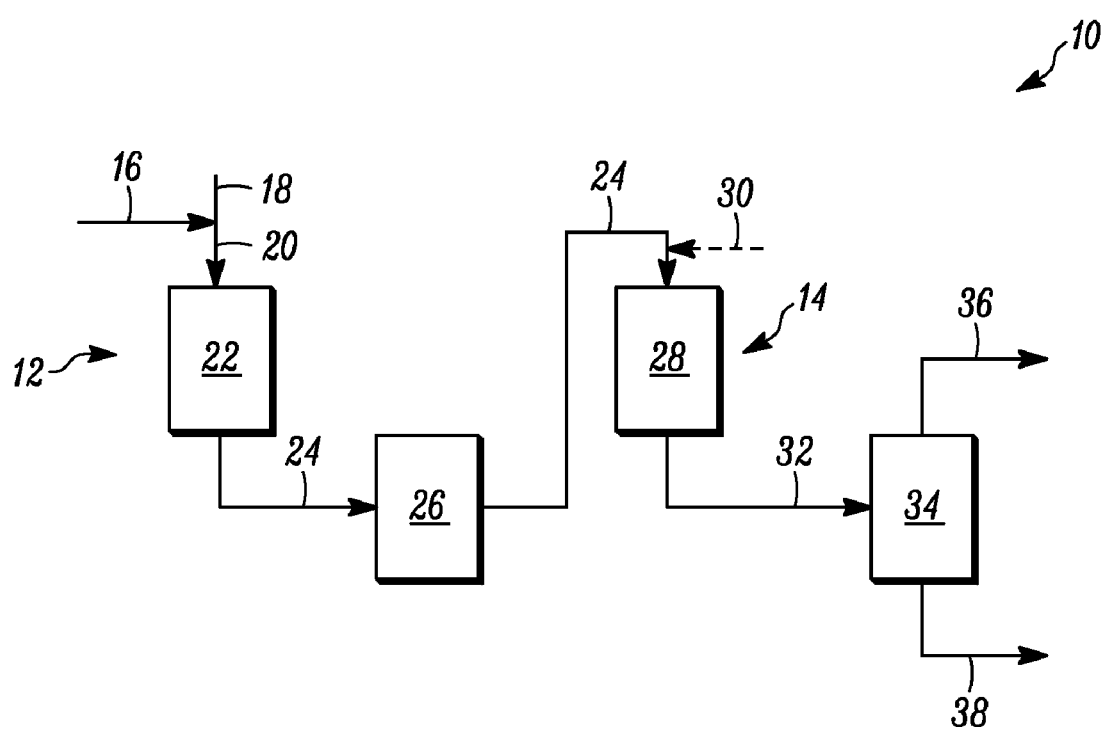

In one aspect, the processes described herein are particularly useful for desulfurizing a hydrocarbon stream with minimal octane loss and with minimal recombination of sulfur into mercaptans. In such aspect, a hydrocarbon feed stream is desulfurized at selected conditions in a sequential, multi-stage process that includes at least first and second hydrodesulfurization zones. In such aspect, inter-stage hydrogen sulfide removal is generally unnecessary, as the selected conditions of the second reaction zone disfavor recombination reactions. The processes herein, therefore, preferably avoid the complexity of inter-stage sulfur removal and permit the effluent from the first stage reaction zone to be directly fed into the second stage reaction zone.

In one particular aspect, an olefinic naphtha feed stream is desulfurized in a first hydrotreating zone under selected conditions to remove sulfur from the feed stream and also disfavor olefin saturation to generally maintain the feed's octane level. The resulting effluent from the first hydrotreating zone is then fed directly to the second stage, where a second hydrotreating zone further desulfurizes at selected conditions to disfavor olefin saturation and also minimize the recombination of sulfur to form mercaptans. As a result, the second reaction zone also generally maintains the octane level. Hydrogen sulfide removal between the first and second hydrotreating zones is generally unnecessary because even if hydrogen sulfide is fed to the second hydrotreating zone, recombination is minimized and, preferably, inhibited due to the selected conditions therein.

Preferred hydrocarbon feed stocks include olefinic naphtha such as FCC naphtha, steam cracked naphtha, coker naphtha, or other gasoline boiling range hydrocarbons. A preferred feed stock is a gasoline boiling range feed stock boiling in the range from about 32° C. (90° F.) to about 232° C. (450° F.). Such feeds may have about 100 to about 8000 wppm sulfur, olefin concentrations up to about 60 percent, and octane levels of about 75 to about 95; however, other feed streams, sulfur levels, olefin contents, and octane levels can also be used in the processes herein.

By one approach, the selected hydrocarbonaceous feedstock is first combined with a hydrogen-rich stream and then introduced into a first hydrodesulfurization zone, such as a first hydrotreating zone, to selectively remove sulfur. For example, the feedstock is first introduced into the hydrotreating zone having a hydrotreating catalyst (or a combination of hydrotreating catalysts) and operated at selected hydrotreating conditions effective to convert a majority of the sulfur in the feed to hydrogen sulfide and minimize saturation of olefins at the same time. In general, such selective conditions include a temperature from about 260° C. (500° F.) to about 315° C. (600° F.), a pressure from about 0.69 MPa (100 psig) to about 3.45 MPa (500 psig), a liquid hourly space velocity of the fresh hydrocarbonaceous feedstock from about 0.5 $hr^{-1}$ to about 10 $hr^{-1}$. Other hydrotreating conditions are also possible depending on the particular feed stocks being treated. The first hydrotreating zone may contain a single or multiple reactor and each reactor may contain one or more reaction zones with the same or different catalysts to convert sulfur and nitrogen to hydrogen sulfide and ammonia.

Suitable hydrotreating catalysts for use in the first hydrotreating zone are any known conventional hydrotreating catalysts and include those which are comprised of at least one Group VIII metal (preferably iron, cobalt and nickel, more preferably cobalt and/or nickel) and at least one Group VI metal (preferably molybdenum and tungsten) on a high surface area support material, preferably alumina. Other suitable hydrotreating catalysts include zeolitic catalysts, as well as noble metal catalysts where the noble metal is selected from palladium and platinum. It is within the scope of the processes herein that more than one type of hydrotreating catalyst be used in the same reaction vessel. The Group VIII metal is typically present in an amount ranging from about 0.5 to about 20 weight percent, preferably from about 0.5 to about 10 weight percent. The Group VI metal will typically be present in an amount ranging from about 1 to about 25 weight percent, and preferably from about 1 to about 12 weight percent. While the above describes some exemplary catalysts for hydrotreating, other hydrotreating and/or hydrodesulfurization catalysts may also be used depending on the particular feedstock and the desired effluent quality.

By this approach, in this aspect, the selected conditions in the first hydrotreating zone are effective to convert greater than about 50 percent of the sulfur from the hydrocarbon feed to hydrogen sulfide and, preferably, about 60 to about 80 percent of the sulfur to hydrogen sulfide. At the same time, the selected conditions disfavor olefin saturation to generally maintain the octane level. For example, the first reaction zone minimizes olefin saturation to about 15 to about 30 percent in order to minimize octane loss. In other words, in this aspect, the hydrocarbon feed stream typically only experiences an octane loss of about 0.5 to about 1.5 octane number in the first reaction zone. It should be appreciated, however, that these conversion levels may vary depending on feed composition, operating conditions, and other variables.

In another aspect, the effluent from the first hydrotreating zone is then fed directly to a second hydrodesulfurization zone. In such aspect, the process preferably does not remove any hydrogen sulfide prior to the second hydrodesulfurization zone, minimizing the expense and complexity of these additional separation steps. Optionally, the effluent from the first hydrotreating zone is fed through a pre-heater to raise the temperature to that required by the second stage. As further described below, hydrogen sulfide removal from the feed to the second reaction zone is generally unnecessary because the selected operating conditions used in the second zone generally minimize subsequent mercaptan formation.

In another aspect, the effluent stream from the first hydrotreating zone is then combined with a hydrogen-rich stream and introduced into a second hydrodesulfurization zone, such as a second hydrotreating zone, to further selectively remove sulfur. In one aspect, the effluent is introduced into the second hydrotreating zone having a selective hydrotreating catalyst (or a combination of selective hydrotreating catalysts) and operated at selected hydrotreating conditions effective to provide a reduction in sulfur levels, minimize mercaptan formation, and minimize olefin saturation. In general, such selected conditions include an optimized catalyst configuration and a temperature from about 315° C. (600° F.) to about 398° C. (750° F.), a pressure from about 0.69 MPa (100 psig) to about 3.45 MPa (500 psig), a liquid hourly space velocity of the fresh hydrocarbonaceous feedstock from about 0.5 $hr^{-1}$ to about 15 $hr^{-1}$. Other hydrotreating conditions are also possible depending on the particular feed stocks being treated. The second hydrotreating zone may contain a single or multiple reactor (preferably trickle-bed reactors) and each reactor may contain one or more reaction zones with the same or different catalysts to convert sulfur and nitrogen to hydrogen disulfide and ammonia.

In another aspect, the selected operating conditions in the second hydrotreating zone preferably include an optimized catalyst configuration having a layered or eggshell configuration with an inner core and an outer layer containing active, desulfurization metals. In such aspect, the outer core has an active layer with a thickness optimized to favor desulfurization reactions over olefin saturation reactions. In one aspect, the thickness of the outer layer is about 5 to about 100 microns, in another aspect, about 5 to about 50 microns and, in yet another aspect, about 5 to about 30 microns in order to favor desulfurization reactions over olefin saturation reactions. Such selectivity is even favored at high temperatures over about 315° C. (600° F.). Thicker active layers would tend to favor more olefin saturation resulting in an undesirable selectivity, while a thinner active layer would have insufficient desulfurization activity.

As discussed further in the Example below, such layered catalyst in combination with a high temperature provides an unexpected step change in selectivity (i.e., desulfurization reactions over olefin saturation reactions) where it would be expected that higher temperatures would generally lead to a decrease in selectivity. While not intending to be limited by theory, it is believed that such selectivity is due at least in part to the thin layer having sufficient desulfurization activity, but also being sufficiently thin to provide insufficient contact time between the oil and active metals to saturate olefins.

By one approach, the layered catalyst composition comprises an inner core composed of an inorganic oxide, which has substantially lower adsorptive capacity for catalytic metal precursors relative to the outer layer. Preferably, the inner core is a refractory inorganic oxide, but can be non-refractory. Examples of refractory and non-refractory inorganic oxides suitable for the inner core include without limitation alpha alumina, theta alumina, silicon carbide, metals, cordierite, zirconia, titania and mixtures thereof. A preferred refractory inorganic oxide for the inner core is cordierite. Suitable layered catalysts can be formed as described in U.S. Pat. No. 6,177,381 B1, which is incorporated by reference herein in its entirety. However, suitable catalysts can also be prepared using other methods, materials, and conditions.

By this approach, in this aspect, the selective operating conditions in the second reaction zone are effective convert about 80 to about 90 percent sulfur to hydrogen sulfide in order to preferably reduce sulfur levels to about 10 ppm or less. At the same time, the conditions also minimize olefin saturation to less than about 10 to about 20 percent and form less than about 10 ppm mercaptans. The effluent from the second reaction zone, therefore, generally maintains an octane rating with only about 0.3 to about 1 octane number loss in the second reaction zone.

In one such method, the inner core can be formed into a variety of shapes such as pellets, extrudates, spheres or irregularly shaped particles. It is recognized, however, that not all materials can be formed into any shape. Preparation of the inner core can be done by oil dropping, pressure molding, metal forming, pelletizing, granulation, extrusion, rolling methods and marumerizing to suggest but a few formation methods. A spherical or cylindrical inner core is preferred. Once the inner core is prepared, it can be calcined at a temperature of about 400° C. (752° C.) to about 1500° C. (2732° F.).

In another aspect, the inner core is then coated with an outer layer of a non-refractory inorganic oxide which is the same or different from the inorganic oxide which may be used as the inner core. Examples of non-refractory inorganic oxides suitable for the outer layer include without limitation theta alumina, silicon carbide, metals, zirconia, titania, gamma alumina, delta alumina, eta alumina, silica/alumina, zeolites, non-zeolitic molecular sieves (NZMS), hydrotalcite and mixtures thereof. In such aspect, this outer layer of non-refractory oxide is one which has a relatively high surface area of between about 50 and 200 $m^2/g$ based on the weight of the outer layer; however, other surface areas are also possible. As discussed above, in one aspect, the outer layer thickness is between about 1 and about 100 microns, in another aspect, between about 5 and about 50 microns, and in yet another aspect, between about 25 and about 30 microns.

In another aspect, the outer layer has a number of pores distributed across its surface. The pores in the outer layer of the catalyst will, in one aspect, have an average pore radius of between about 65 to about 75 Angstrom. In some cases, the pore radius size distribution will, however, vary from about 20 to about 250 Angstrom. In other aspects, the pore volume is substantially proportional to the thickness of the outer layer and the average radius of the pores. For example, where the outer layer is approximately 100 micron thick, the total pore volume will be about 0.10 to about 0.15 cc/g. Where the outer layer is approximately 200 micron thick, the total pore volume will be about 0.20 to about 0.30 cc/g. The surface area of a catalyst having a 100 micron thick outer layer will be approximately 35 $m^2/g$, while the surface area of a catalyst having a 200 micron thick outer layer will be approximately 65 $m^2/g$, based on the weight of the catalyst. Such surface areas, however, are only exemplary and may vary depending on the catalyst, feed stocks, and operating conditions.

In aspects, it should be appreciated that silica/alumina is generally not a physical mixture of silica and alumina but is generally an acidic and amorphous material that has been cogelled or coprecipitated. (See, e.g., U.S. Pat. Nos. 3,909, 450 A; 3,274,124 A; and 4,988,659 A.) Examples of zeolites include, but are not limited to, zeolite Y, zeolite X, zeolite L, zeolite beta, ferrierite, MFI, mordenite and erionite. Non-zeolitic molecular sieves (NZMS) are those molecular sieves which contain elements other than aluminum and silicon and include silicoaluminophosphates (SAPOs) described in U.S. Pat. No. 4,440,871 A, ELAPOs described in U.S. Pat. No. 4,793,984 A, MeAPOs described in U.S. Pat. No. 4,567,029 A. In a preferred aspect, an inorganic oxide for the outer layer is gamma alumina.

In yet another aspect, one method of preparing a gamma alumina is by an oil drop method, which is described in U.S. Pat. No. 2,620,314 A and incorporated by reference in its entirety. The oil drop method comprises forming an aluminum hydrosol and, in one aspect, by reacting aluminum metal with hydrochloric acid; combining the hydrosol with a suitable gelling agent, e.g., hexamethylenetetramine; and dropping the resultant mixture into an oil bath maintained at elevated temperatures (about 93° C. (199° F.)). The droplets of the mixture remain in the oil bath until they set and form hydrogel spheres. The spheres are then continuously withdrawn from the oil bath and typically subjected to specific aging and drying treatments in oil and ammoniacal solutions to further improve their physical characteristics. The resulting aged and gelled spheres are then washed and dried at a relatively low temperature of about 80° C. (176° F.) to about 260° C. (500° F.) and then calcined at a temperature of about 455° C. (851° F.) to about 705° C. (1301° F.) for a period of about 1 to about 20 hours. This treatment effects conversion of the hydrogel to the corresponding crystalline gamma alumina.

In another aspect, the outer layer can be applied by forming a slurry of the outer non-refractory oxide and then coating the inner core with the slurry. Slurries of inorganic oxides usually involve the use of a peptizing agent. For example, any of the transitional aluminas can be mixed with water and an acid such as nitric, hydrochloric, or sulfuric to give a slurry. Alternatively, an aluminum sol can be made by for example, dissolving aluminum metal in hydrochloric acid and then mixing the aluminum sol with the alumina powder.

In another aspect, the slurry can also contain an organic bonding agent which aids in the adhesion of the layer material to the inner core. Examples of this organic bonding agent include but are not limited to polyvinyl alcohol (PVA), hydroxy propyl cellulose, methyl cellulose and carboxy methyl cellulose. The amount of organic bonding agent which is added to the slurry will vary considerably from about 0.1 weight percent to about 3 weight percent of the slurry. How strongly the outer layer is bonded to the inner core can be measured by the amount of layer material lost during an attrition test, i.e., attrition loss. In one aspect, loss of the outer layer by attrition is measured by agitating the catalyst, collecting the fines and calculating an attrition loss, in the manner described in Example 11 in U.S. Pat. No. 6,177,381 B1, which is incorporated herein by reference. In such aspect, it has been found that by using an organic bonding agent as described above, the attrition loss is less than about 10 weight percent of the outer layer.

Depending on the particle size of the outer inorganic oxide, it may, in another aspect, be necessary to mill the slurry in order to reduce the particle size and simultaneously give a narrower particle size distribution. This can be done, for example, by ball milling for about 30 min to about 5 hours and preferably from about 1.5 to about 3 hours. In some aspects, it has been found that using a slurry with a narrow particle size distribution improves the bonding of the outer layer to the inner core. Without wishing to be bound to any particular theory, it appears that bonding agents such as PVA aid in making an interlocking bond between the outer layer material and the inner core. Whether this occurs by the PVA reducing the surface tension of the core or by some other mechanism is not clear. What is clear is that, in some aspects, a considerable reduction in loss of the outer layer by attrition is observed.

In another aspect, the slurry may also contain an inorganic bonding agent selected from an alumina bonding agent, a silica bonding agent or mixtures thereof. Examples of silica bonding agents include silica sol and silica gel, while examples of alumina bonding agents include alumina sol, boehmite and aluminum nitrate. In such aspect, the inorganic bonding agents are converted to alumina or silica in the finished composition. The amount of inorganic bonding agent may vary from about 2 to about 15 weight percent as the oxide, and based on the weight of the slurry.

In another aspect, the slurry can also contain a modifier metal selected from the group consisting of alkali metals, alkaline earth metals and mixtures thereof. The alkali and alkaline earth metals which can be used as modifier metals in the practice of this invention include lithium, sodium, potassium, cesium, rubidium, beryllium, magnesium, calcium, strontium and barium. Preferred modifier metals are lithium, potassium, sodium and cesium with lithium and sodium being especially preferred. One method involves preparing the slurry with a solution (preferably aqueous) of a decomposable compound of the modifier metal or modifier metal precursor. By decomposable is meant that upon heating the metal compound is converted to the metal or metal oxide with the release of byproducts. Illustrative of the decomposable compounds of the alkali and alkaline earth metals include, but are not limited to, the halide, nitrate, carbonate or hydroxide compounds, e.g., potassium hydroxide, lithium nitrate.

In another aspect, coating of the inner core with the slurry can be accomplished by means such as rolling, dipping, spraying, etc. One preferred technique involves using a fixed fluidized bed of inner core particles and spraying the slurry into the bed to coat the particles evenly. As discussed above, the thickness of the layer can vary, but usually is from about 1 to about 100 micron in some aspects, from about 5 to about 50 micron in other aspects, and from about 5 to about 30 microns in yet other aspects. It should be appreciated that the optimum layer thickness depends on the use for the catalyst and the choice of the outer inorganic oxide and the selectivity desired among other considerations. In another aspect, once the inner core is coated with the layer of outer inorganic oxide, the resultant layered support may be dried at a temperature of about 100° C. (212° F.) to about 320° C. (608° F.) for a time of about 1 to about 24 hours and then calcined at a temperature of about 400° C. (752° F.) to about 900° C. (1652° F.) for a time of about 0.5 to about 10 hours to effectively bond the outer layer to the inner core and provide a layered catalyst support. Of course, the drying and calcining steps can be combined into one step and other processing conditions and temperatures may be used depending on the particular application.

Having obtained the layered catalyst support, the catalytic metals and/or metal precursors can be dispersed on the layered support. By one approach, the active metals include any known conventional hydrotreating catalysts and include those which are comprised of at least one Group VIII metal (preferably iron, cobalt and nickel, more preferably cobalt and/or nickel) and/or at least one Group VI metal (preferably molybdenum and tungsten). Other suitable hydrotreating catalysts include zeolitic catalysts, as well as noble metal catalysts where the noble metal is selected from palladium and platinum. It is within the scope of the processes herein that more than one type of hydrotreating catalyst be used in the same reaction vessel.

In general, the Group VIII metal in the outer layer of the layered catalyst is typically present in an amount ranging from about 0.5 to about 10 weight percent, preferably from about 0.5 to about 5 weight percent. The Group VI metal will typically be present in an amount ranging from about 1 to about 25 weight percent, and preferably from about 1 to about 10 weight percent. By one approach, the active metals comprise about 0.5 to about 5 cobalt oxide and about 1 to about 15 molybdenum oxide. While the above describes some exemplary catalysts for hydrotreating, other known hydrotreating and/or hydrodesulfurization catalysts may also be used depending on the particular feedstock and the desired effluent quality. The catalytic metals can be deposited on the layered support, for example, by impregnating the layered support with a solution (preferably aqueous) of a decomposable compound of the metals or metal precursors.

All of the metals can be impregnated into the outer layer using one common solution or they can be sequentially impregnated in any order, but not necessarily with equivalent results. In one aspect, a preferred impregnation procedure involves the use of a steam-jacketed rotary dryer. For example, the catalyst support is immersed in the impregnating solution containing the desired metal compound contained in the dryer and the support is tumbled therein by the rotating motion of the dryer. The catalyst support is preferably in the presence of a liquid phase, and in other aspects in an all-liquid phase. In another aspect, the impregnating solution is present in an excess relative to the amount of catalyst support so that free liquid is present. In other aspects, precipitation of the metals is generally prevented by proper control of the pH of the impregnating solution. In yet other aspects, evaporation of the solution in contact with the tumbling support is expedited by applying steam to the dryer jacket. In further aspects, the resultant composite is allowed to dry under any suitable conditions, such as ambient temperature conditions or at a temperature of about 80° C. (176° F.) to about 110° C. (230° F.), followed by calcination at a temperature of about 400° C. (752° F.) to about 700° C. (1292° F.) for a time of about 1 to about 4 hours, thereby converting the metal compound to the metal or metal oxide.

In one method of preparation, the method involves adding one or more of the metal components to the outer inorganic oxide prior to applying it as a layer onto the inner core. For example, either the Group VIII or Group VI metals or both can be added to the slurry. Thus, in one such method, the catalytic metals are deposited onto the outer inorganic oxide prior to depositing it as a layer onto the inner core. The catalytic metals can be deposited onto the outer refractory oxide powder in any order although not necessarily with equivalent results.

As an optional step in the preparation of the layered catalyst composition, the layered catalyst composition may be treated hydrothermally. Hydrothermal treatment processes generally are used to modify the physical characteristics of non-refractory oxides. For example, in one aspect, hydrothermal treatment comprises subjecting the layered catalyst composition to conditions comprising the presence of water, a temperature of from about 100° C. (212° F.) to about 1200° C. (2192° F.), and a pressure of from about 0 kPa (0 psig) to about 10,133 kPa (1470 psig). During the hydrothermal treatment, the layered catalyst composition may be contacted with a liquid or vapor stream containing water at a concentration of from slightly above 0 volume percent, e.g., 50 vol-ppm, to about 100 volume percent water. In other aspects, the duration of the hydrothermal treatment may be from as little as about 1 minute up to about 10 or about 20 hours, even about 1 or more days.

In one hydrothermal treatment, the layered catalyst composition may be placed in an autoclave, the layered catalyst composition may be then completely covered by a water-containing liquid which is preferably liquid water, next the autoclave is closed and placed in an oven, and the oven is then maintained at a temperature of about 200° C. (392° F.) for a period of time of up to from about 8 to about 10 hours. In another hydrothermal treatment, the layered catalyst composition is placed in an oven or furnace, a gas is passed through the oven or furnace, and the oven is then maintained at a temperature of from about 260° C. (500° F.) to about 816° C. (1500° F.) for a period of time of from about 1 to about 24 hours. In this hydrothermal treatment, water may be carried by the flowing gas across the layered catalyst composition, water may be present in or on the layered catalyst composition prior to its being heated in the oven or furnace, or both. The gas may be any suitable gas, such as a gas comprising air, oxygen, nitrogen, an inert gaseous component, or mixtures thereof.

The optional hydrothermal treatment may be performed prior to or after dispersing the catalytic metals and/or metal precursors on the layered support, prior to or after calcining the layered support. Hydrothermally treating at different steps during the preparation of the layered catalyst composition may not give equivalent results. As optional steps after the hydrothermal treatment, the hydrothermally treated material may be allowed to dry and then may be calcined as described above. If the hydrothermal treatment is done after dispersing the catalytic metals and/or metal precursors on the layered support, the hydrothermal treatment and any subsequent thermal treatments are preferably performed prior to reducing the catalyst composition. If the hydrothermal treatment is done after reducing the catalyst composition, an additional optional reduction step may be performed. Without being bound to any particular theory, it is believed that hydrothermal treatment modifies the pore size distribution of the layered catalyst composition, modifies the size of the metal clusters on the layered catalyst composition if the catalytic metals and/or metal precursors have been dispersed on the layered support prior to the hydrothermal treatment, or modifies both. It is believed that such modifications affect the performance, especially conversion and selectivity, of the layered catalyst composition.

In one aspect, the active metals are uniformly distributed throughout the outer layer of outer inorganic oxide and are substantially present only in the outer layer. Preferably the ratio of the Group VIII to the Group VI metals over the outer layer of the inorganic oxide is substantially constant.

The shape and size of the catalyst particles depends on a number of technical and economic factors and considerations, such as the allowable pressure drop across the selective hydrogenation reactor, the amount of catalyst and the cost of production. In one aspect, the preferred shape of the particle is spherical. In another aspect, it is preferred that the catalyst particle has a diameter of about 0.8 mm (1/32 in.) to about 6.4 mm (1/4 in.) and, in yet another aspect, has a diameter of about 1.6 mm or 1600 micron (1/16 in.).

In another embodiment, the selective catalyst may be prepared as an eggshell catalyst with the active metals deposited in a layer on the outer surface. In this configuration, the active materials are generally dispersed or diffused onto the inner core forming an eggshell layer of the active metals. The thickness of the layer may be controlled, for example, using a sequestering agent, such as citric acid, to limit or stop the diffusion of the active metals to only the outer layers of the inner core. In such a catalyst, the support may be any of the support materials previously described.

DETAILED DESCRIPTION OF THE DRAWING FIGURE

Turning to the FIGURE, an exemplary hydrocarbon processing unit to provide low sulfur olefinic naphtha with minimal saturation of olefins and minimal formation of recombinant mercaptans will be described in more detail. It will be appreciated by one skilled in the art that various features of the above described process, such as pumps, instrumentation, heat-exchange and recovery units, condensers, compressors, flash drums, feed tanks, and other ancillary or miscellaneous process equipment that are traditionally used in commercial embodiments of hydrocarbon conversion processes have not been described or illustrated. It will be understood that such accompanying equipment may be utilized in commercial embodiments of the flow schemes as described herein. Such ancillary or miscellaneous process equipment can be obtained and designed by one skilled in the art without undue experimentation.

With reference to the FIGURE, an integrated processing unit 10 is provided that includes a multi-stage, selective hydrodesulfurization process to sequentially desulfurize an olefinic naphtha feed stream preferably without interstage hydrogen sulfide removal. In one aspect, the process 10 includes a first hydrodesulfurization zone 12 and a second hydrodesulfurization zone 14. In another aspect, the resulting effluent stream 32 from the second reaction zone 14 is low-sulfur, olefinic naphtha having about 10 ppm or less sulfur, with minimal olefins saturated and minimal mercaptans formed.

By one approach, a feed stream preferably comprising an olefinic naphtha, such as an FCC naphtha, is introduced into the process 10 via line 16. A hydrogen-rich gaseous stream is provided via line 18 to produce a resulting admixture that is transported via line 20 to the first hydrodesulfurization zone 12, which includes at least a hydrotreating zone 22 to convert greater than about 50 percent of the sulfur content to hydrogen sulfide. As discussed above, the hydrotreating zone 22 operates at selective conditions, such as about 260° C. (500° F.) to about 315° C. (600° F.), effective to desulfurize and, at the same time, limit olefin saturation to less than about 30 percent. In such aspect, octane loss in the first reaction zone 12 is generally limited to about 0.5 to about 1.5 octane number.

A resulting effluent stream 24 from the first hydrotreating zone 22 is fed directly into the second hydrodesulfurization zone 14 for further desulfurization. If needed, the effluent 24 may be heated in a pre-heater 26 to raise the temperature necessary for the second reaction zone. The effluent 24 is reacted in the second hydrodesulfurization zone 14, which includes at least a hydrotreating zone 28 including a reactor(s) to preferably reduce the level of sulfur to about 10 ppm or less. If needed the feed to the second desulfurization zone may also be admixed with a hydrogen-rich gaseous stream provided by line 30 if additional hydrogen is needed. As discussed above, the hydrotreating zone 28 operates at selective conditions, such as about 315° C. (600° F.) to about 398° C. (750° F.) using an optimized layered catalyst having a thin active layer between about 5 and about 100 microns effective to desulfurize and, at the same time, limit olefin saturation to less than about 20 percent and mercaptan formation to less than about 10 ppm. In one aspect, octane loss in the second reaction zone 14 is generally limited to about 0.3 to about 1 octane number.

The effluent stream 32 from the second hydrodesulfurization zone may be directed to a separation zone 34. In the separator, a gaseous stream 36 containing hydrogen sulfide may be separated from a low sulfur gasoline boiling stream 38. For example, the second hydrodesulfurization zone effluent may be first contacted with an aqueous stream to dissolve any ammonium salts and then partially condensed. The stream may then be introduced into the vapor-liquid separator 34 typically operating to produce a vaporous hydrocarbonaceous stream boiling in the range from about 0° C. (30° F.) to about 32° C. (90° F.) and a liquid hydrocarbonaceous stream having a reduced concentration of sulfur and boiling in a range greater than the vaporous hydrocarbonaceous stream. By one approach, the separator operates at a temperature from about 4° C. (40° F.) to about 121° C. (250° F.) and a pressure from about 0.69 MPa (100 psig) to about 3.45 MPa (500 psig) to separate such streams. The liquid effluent 38 from the separator 34 is the desired low sulfur gasoline preferably having about 10 ppm or less sulfur and a total octane loss from both reaction zones of about 0.8 to about 2.5.

The foregoing description of the drawing clearly illustrates the advantages encompassed by the processes described herein and the benefits to be afforded with the use thereof. In addition, the drawing FIGURE is intended to illustrate but one exemplary flow scheme of the processes described herein, and other processes and flow schemes are also possible. It will be further understood that various changes in the details, materials, and arrangements of parts and components which have been herein described and illustrated in order to explain the nature of the process may be made by those skilled in the art within the principle and scope of the process as expressed in the appended claims. All patents, publications, and references disclosed herein are hereby incorporated by reference.

In addition, advantages and embodiments of the process and catalyst described herein are further illustrated by the following example; however, the particular conditions, flow schemes, materials and amounts thereof recited in this example, as well as other conditions and details, should not be construed to unduly limit this invention. All percentages are by weight unless otherwise indicated.

EXAMPLE

An FCC naphtha feedstock comprising greater than about 2200 ppm sulfur and about 24 percent olefins (determined using PIONA) was hydrodesulfurized in three separate experiments using three separate catalysts as described in Table 1.

TABLE 1

Catalyst Descriptions

| Catalyst ID | Description |
|---|---|
| A | A conventional sized hydrotreating catalyst including cobalt and molybdenum |
| B | Catalyst A granulated to 8/14 mesh |
| C | Layered sphere catalyst having the same composition of cobalt and molybdenum as Catalyst A on a 100 micron outer layer |

A separate FCC naphtha feed stock was desulfurized at about 1.72 MPa (250 psig), about 273° C. (525° F.) to about 296° C. (565° F.) at a liquid hour space velocity of about 3 hr$^{-1}$ with about 1500 SCF/B hydrogen by contacting the feed with each of catalyst A, B, and C to reduce the level of sulfur. A summary of the conditions and results of each experiment is provided in Table 2 below.

TABLE 2

Operating Conditions and Results

| | Catalyst | | |
|---|---|---|---|
| | A | B | C |
| Feed | | | |
| Specific Gravity, gm/cc | 0.7719 | 0.7719 | 0.7712 |
| Sulfur, wppm | 2382 | 2382 | 2206 |
| Olefins, weight percent | 24.3 | 24.3 | 23.8 |
| IBP, ° F. | 72 | 72 | 72 |
| 50 percent, ° F. | 248 | 248 | 249 |
| 99 percent, ° F. | 476 | 476 | 474 |
| Process Conditions | | | |
| LHSV, hr$^{-1}$ | 3 | 3 | 3 |
| Pressure, psig (MPa) | 250 | 250 | 250 |
| H$_2$/Oil, SCF/B (Nl/l) | 1500 | 1510 | 1493 |
| Temperature, ° F. | 526 | 525 | 565 |
| Product | | | |
| Sulfur, wppm | 276 | 319 | 285 |
| Olefins, weight percent | 18.2 | 20.0 | 20.4 |

A selectivity ratio of a desulfurization reaction over an olefin saturation reaction was determined in each case. Selectivity ratio for each catalyst was determined by comparing the sulfur conversion to the olefin conversion based on the following formula:

Selectivity Ratio=(100)(Sulfur Conversion/Olefin Conversion)

where
 Sulfur Conversion=$(S_f-S_p)/S_f$;
 Olefin Conversion=$(O_f-O_p)/O_f$;
 $S_f$=sulfur content in the feed;
 $S_p$=sulfur content in the hydrodesulfurization zone effluent;
 $O_f$=olefin content in the feed; and
 $O_p$=olefin content in the hydrodesulfurization zone effluent.

Conversion levels and selectively ratio of each catalyst is summarized in Table 3 below.

TABLE 3

Conversions and Selectivity

| | Catalyst | | |
|---|---|---|---|
| | A | B | C |
| Sulfur Conversion, percent | 88.4 | 86.6 | 87.1 |
| Olefin Conversion, percent | 25.1 | 17.7 | 14.3 |
| Selectivity Ratio | 352 | 489 | 610 |

In this instance with a 100 micron active layer, layered catalyst C provided a selectivity of at least about 610. The conventional catalyst A and the granulated conventional catalyst B only provided maximum selectivities of about 352 and about 489, respectively. The layered catalyst C provided a significantly better selectivity than both of the conventional hydrotreating catalysts, including the granulated conventional catalyst B, which would have practical limitations due to expected high pressure drops in a catalyst bed due to the small size of the ground catalyst. Catalyst C, which was reacted at a higher temperature, still provided an increase in catalyst selectivity of at least 73 percent over catalyst A and an increase in catalyst selectivity of at least 25 percent over the granulated catalyst B. In each case, because the feed was desulfurized to about 270 to about 320 ppm sulfur, the high selectivity of catalyst C indicates that the layered catalyst with a 100 micron outer layer of active materials generally desulfurized the feed to the same level as the commercial catalysts A and B, but did so with less olefin saturation, which generates less octane loss in the effluent.

It will be understood that various changes in the details, materials, and arrangements of parts and components which have been herein described and illustrated in order to explain the nature of the process may be made by those skilled in the art within the principle and scope as expressed in the appended claims. In addition, any reference cited herein is also hereby incorporated herein by reference in its entirety.

What is claimed is:

1. A hydrodesulfurization process comprising:
providing an olefinic naphtha stream having an olefin content and a sulfur content;
reacting the olefinic naphtha stream in a first hydrodesulfurization zone at a first reaction temperature effective to convert a portion of the sulfur content to hydrogen sulfide;
reacting the first hydrodesulfurization zone effluent in a second hydrodesulfurization zone at a second, higher reaction temperature and with a catalyst effective to desulfurize forming a second hydrodesulfurization zone effluent; and
the second hydrodesulfurization zone catalyst including an inner core and a thin outer layer about 5 to about 30 microns thick surrounding the inner core, the thin outer layer including a hydrodesulfurization catalyst.

2. The process of claim 1, wherein less than about 30 percent of the olefin content is saturated in the first hydrodesulfurization zone and less than about 20 percent of the olefin content is saturated in the second hydrodesulfurization zone.

3. The process of claim 1, wherein a selectivity ratio of the hydrodesulfurization catalyst in the second hydrodesulfurization zone is greater than about 500 wherein
Selectivity Ratio=(100)(Sulfur Conversion/Olefin Conversion);
Sulfur Conversion=$(S_f-S_p)/S_f$;
Olefin Conversion=$(O_f-O_p)/O_f$;
$S_f$=sulfur content in the first hydrodesulfurization zone effluent;
$S_p$=sulfur content in the second hydrodesulfurization zone effluent;
$O_f$=olefin content in the first hydrodesulfurization zone effluent; and
$O_p$=olefin content in the second hydrodesulfurization zone effluent.

4. The process of claim 1, wherein the first hydrodesulfurization reaction zone effluent is fed to the second hydrodesulfurization reaction zone without the removal of significant amounts of hydrogen sulfide formed in the first hydrodesulfurization reaction zone.

5. The process of claim 1, wherein the first hydrodesulfurization zone effluent has an octane number loss from about 0.5 to about 1.5.

6. The process of claim 5, wherein the second hydrodesulfurization zone effluent has about 10 ppm or less sulfur and an octane number loss from about 0.3 to about 1.

7. The process of claim 1, wherein the first temperature of the first hydrodesulfurization zone is about 260° C. (500° F.) to about 315° C. (600° F.).

8. The process of claim 1, wherein the second temperature of the second hydrodesulfurization zone is about 315° C. (600° F.) to about 398° C. (750° F.).

9. The process of claim 1, wherein the hydrodesulfurization catalyst includes about 0.5 to about 5 weight percent cobalt oxide and about 0.5 to about 20 weight percent molybdenum oxide.

10. A hydrodesulfurization process comprising:
providing an olefinic naphtha stream having an olefin content and a sulfur content;
reacting the olefinic naphtha stream in a first hydrodesulfurization reaction zone at a first temperature effective to favor desulfurization over olefin saturation and forming a first hydrodesulfurization reaction zone effluent having a portion of the sulfur content converted to hydrogen sulfide;
reacting the first hydrodesulfurization reaction zone effluent in a second hydrodesulfurization reaction zone at a second, higher temperature and with a catalyst effective to favor desulfurization over olefin saturation to form a second hydrodesulfurization reaction zone effluent; and
the catalyst including an inner core and a thin outer layer about 5 to about 100 microns thick surrounding the inner core, the thin outer layer including a hydrodesulfurization catalyst having an Olefin Conversion less than about 0.10 and a selectivity ratio greater than about 500 wherein
Selectivity Ratio=(100)(Sulfur Conversion/Olefin Conversion);
Sulfur Conversion=$(S_f-S_p)/S_f$;
Olefin Conversion=$(Of-O_p)/O_f$;
$S_f$=sulfur content in the feed to the second hydrodesulfurization zone;
$S_p$=sulfur content in the second hydrodesulfurization zone effluent;
$O_f$=olefin content in the feed to the second hydrodesulfurization zone; and
$O_p$=olefin content in the second hydrodesulfurization zone effluent.

11. The process of claim 10, wherein converting the olefinic naphtha stream in the first hydrodesulfurization reaction zone saturates less than about 30 percent of the olefin content in the olefinic naphtha stream.

12. The process of claim 11, wherein the first hydrodesulfurization reaction zone effluent has about 50 to about 80 percent sulfur converted to hydrogen sulfide.

13. The process of claim 10, wherein converting the first hydrodesulfurization reaction zone effluent in a second hydrodesulfurization forms less than about 10 ppm mercaptans.

14. The process of claim 13, wherein the second hydrodesulfurization zone effluent has about 10 ppm or less of sulfur.

15. The process of claim 10, wherein the first hydrodesulfurization reaction zone effluent is fed directly to the second hydrodesulfurization reaction zone without removal of any hydrogen sulfide.

16. The process of claim 10, wherein the first temperature of the first hydrodesulfurization zone is about 260° C. (500° F.) to about 315° C. (600° F.) and the second temperature of the second hydrodesulfurization zone is about 315° C. (600° F.) to about 398° C. (750° F.).

17. A hydrodesulfurization process comprising:
providing an olefinic naphtha stream having an olefin content and a sulfur content;

reacting the olefinic naphtha stream in a hydrodesulfurization zone at temperatures greater than 315° C. (600° F.) with a catalyst effective to favor desulfurization over olefin saturation to form an effluent having a reduced sulfur content relative to the olefinic naphtha stream;

the catalyst including an inner core and a thin outer layer about 5 to about 30 microns thick surrounding the inner core effective to favor desulfurization over olefin saturation.

18. The hydrodesulfurization process of claim 17, wherein the catalyst has a selectivity ratio of the catalyst greater than about 500 wherein Selectivity Ratio=(100) (Sulfur Conversion/Olefin Conversion);

Sulfur Conversion=$(S_f-S_p)/S_f$;

Olefin Conversion=$(O_f-O_p)/O_f$;

$S_f$=sulfur content in the olefinic naphtha stream;

$S_p$=sulfur content in the effluent;

$O_f$=olefin content in the olefinic naphtha stream; and $O_p$=olefin content in the effluent.

19. The process of claim 17, wherein at least about 85 percent of the sulfur content is converted to hydrogen sulfide and less than about 15 percent of the olefin content is saturated.

* * * * *